United States Patent [19]

Anderson et al.

[11] Patent Number: 4,574,937

[45] Date of Patent: Mar. 11, 1986

[54] GUIDE AND HAND RAIL WITH LATCH

[75] Inventors: James M. Anderson, Windermere; William C. Dean, Orange City, both of Fla.

[73] Assignee: FMC Corporation, Chicago, Ill.

[21] Appl. No.: 586,521

[22] Filed: Mar. 5, 1984

[51] Int. Cl.$^4$ .............................................. B65G 17/00
[52] U.S. Cl. .................................... 198/321; 198/836; 182/106; 403/100
[58] Field of Search ................ 182/106; 198/836, 632, 198/316, 315, 318, 321, 324, 861; 403/100; 248/439; 108/60

[56] References Cited

U.S. PATENT DOCUMENTS

| | | | |
|---|---|---|---|
| 1,788,102 | 1/1931 | Gilbert | 403/100 |
| 1,811,706 | 6/1931 | Bessler | 182/106 |
| 1,863,648 | 6/1932 | Bernard | 198/632 X |
| 1,881,902 | 10/1932 | Osterdahl | 182/106 X |
| 2,738,913 | 3/1956 | Taylor | 182/106 |
| 2,794,531 | 6/1957 | Stelzer | 198/321 |
| 3,051,295 | 8/1962 | Moy | 198/632 X |
| 4,279,566 | 7/1981 | Sagaser et al. | 403/100 X |

FOREIGN PATENT DOCUMENTS 1760 of 1892 United Kingdom ................ 182/106

*Primary Examiner*—Joseph E. Valenza
*Assistant Examiner*—Jonathan D. Holmes
*Attorney, Agent, or Firm*—Richard B. Megley; Ronald C. Kamp

[57] ABSTRACT

A multi-positionable rail for the conveyor of an aircraft belt loader having a rail supported by a plurality of parallel posts pivoted to the side wall of the conveyor and to the rail and collapsible under the force of gravity against a stop positioned on the conveyor side wall to a stowed position wherein the posts and rail are within the silhouette of the conveyor. A first support arm pivoted on the conveyor engages a first pin on a post to position the rail above the conveyor to function as a hand rail and a second support pivoted on the conveyor engage a second pin on a post to position the rail intermediate the stowed and hand rail position. A latch trapped on the post above the first pin is urged by gravity to engage the pin to prevent disengagement of the first arm from the first pin.

2 Claims, 5 Drawing Figures

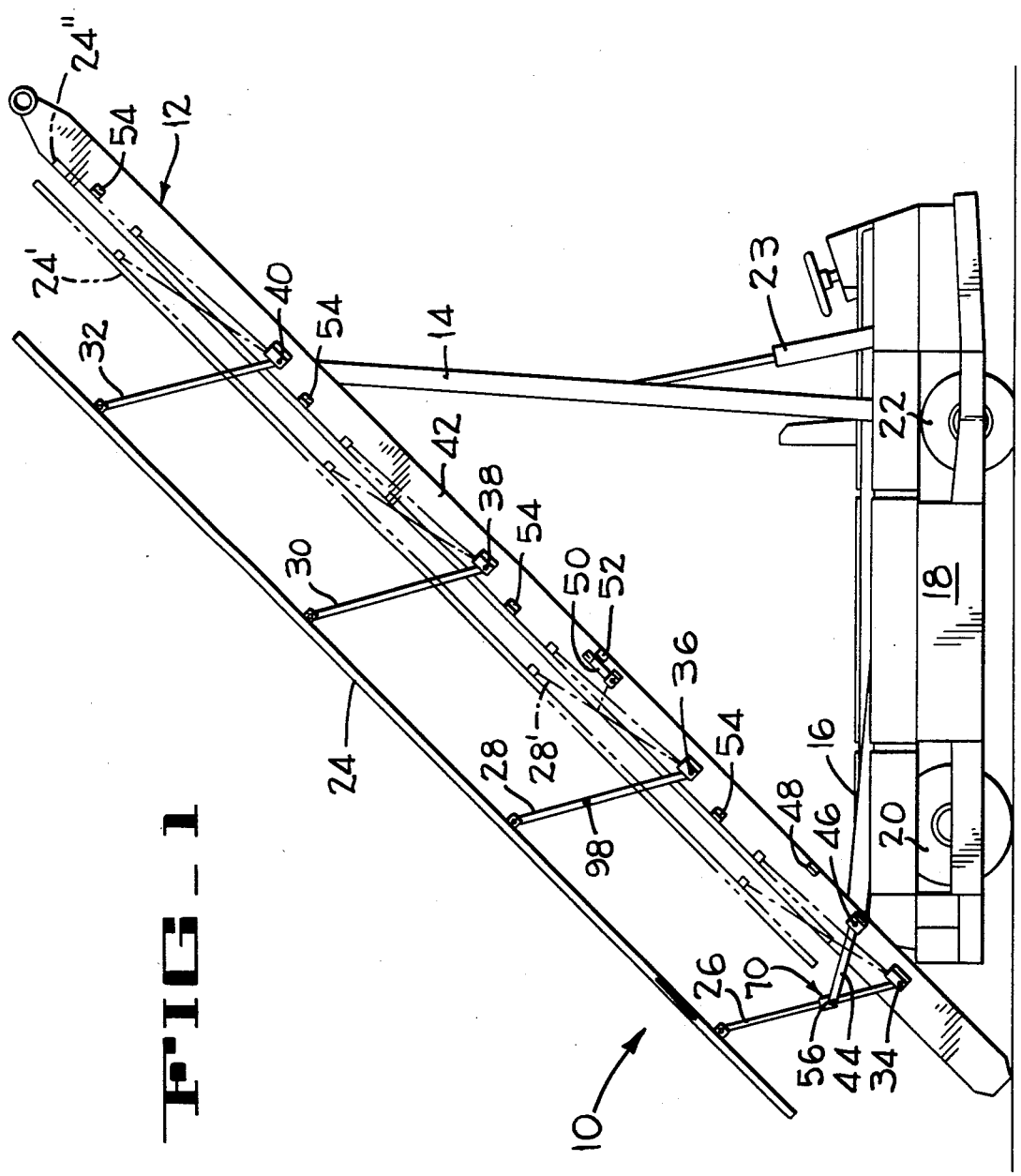

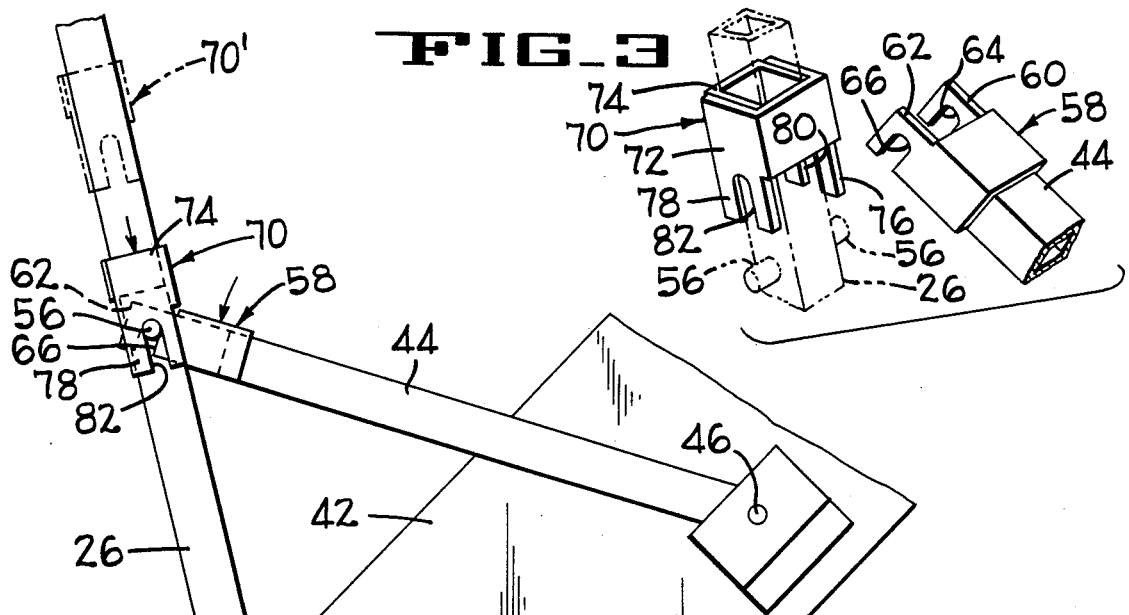
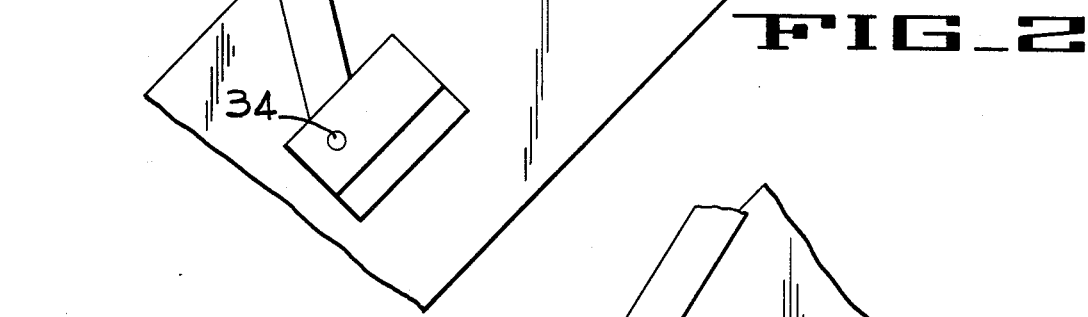
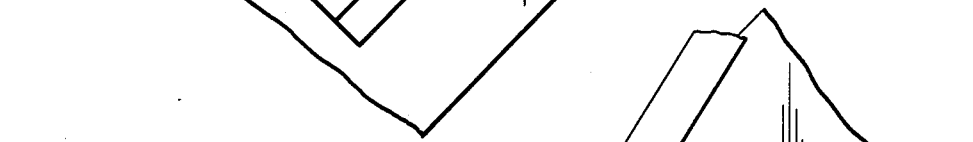
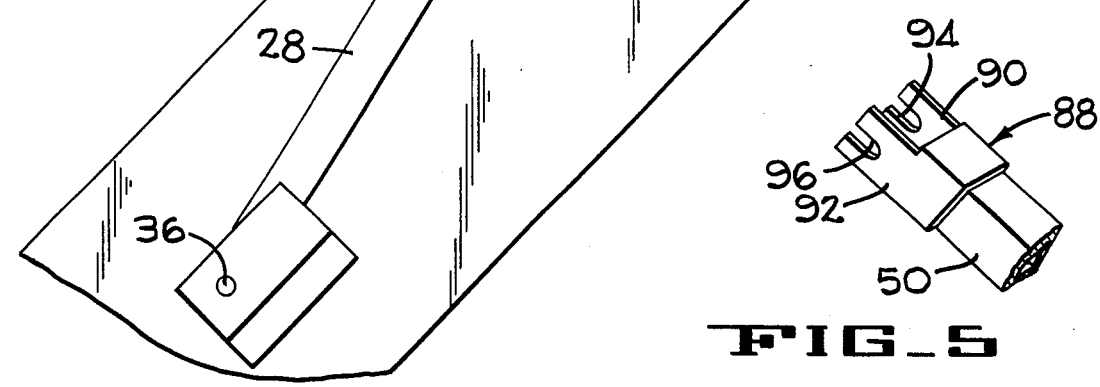

GUIDE AND HAND RAIL WITH LATCH

This invention relates to a rail which can function as either a guide rail for a belt conveyor or as a hand rail for use of the belt as a walkway for personnel.

The present invention is a multi-purpose rail for use with an aircraft belt loader in which the rail may be positioned as a hand rail to assist personnel in traversing the belt, when stationary or inoperative, for ingress to or egress from an aircraft, or positioned a short distance above the belt to function as a guide rail for positioning luggage or packages on the belt in loading or unloading the aircraft. In addition, the rail may be fully lowered alongside the conveyor to a transport position wherein the rail presents no obstruction to the field of vision of the operator driving the loader. The arrangement for positioning the rail in the three positions according to the present invention is self contained, i.e. no tolls or separable retainers, such as pins which must be inserted through aligned hole, are required. In addition the present invention provides a latch for retaining the rail in its handrail position to preclude accidental or inadvertant release from this position. Other features and desirable attributes of the present invention will become apparent upon perusal of the following description and the accompanying drawings.

In the drawings, FIG. 1 is a side elevational view of an aircraft belt loader incorporating a rail according to the present invention;

FIG. 2 is a detailed view of a portion of FIG. 1 showing the means for retaining the rail in this elevated position for use as a hand rail;

FIG. 3 is a three dimensional view of the hook and latch arrangement of FIG. 2;

FIG. 4 is a side elevational view of the means for holding the rail in its guide rail position; and FIG. 5 is a three dimensional view of the retaining arm shown in FIG. 4.

Referring to FIG. 1, an aircraft belt loader, indicated generally at 10, includes a belt conveyor 12 mounted by links 14 and 16 on a chassis 18, which has drive wheels 20 and steerable wheels 22 for maneuvering of the loader into an appropriate position adjacent a selected aircraft. The links 14 and 16 may be raised and lowered independently by hydraulic cylinders, one of which is shown at 23, connected to the links 14 and 16 to position the conveyor 12 at the proper elevation relative to an aircraft freight door at its upper end and relative to a wagon or cart at its lower end. As illustrated in FIG. 1, the conveyor 12 is oriented at its extremes of raised front and lowered rear ends, but may be positioned at any chosen orientation within the limits of the linkage arrangement.

The rail 24 is pivotally attached to each of the posts 26, 28, 30 and 32; each of the posts being pivotally secured by pins 34, 36, 38 and 40 respectively to the side wall 42 of the conveyor 12. The rail is retained in the elevated position, as shown by solid lines in FIG. 1, wherein it is usable as a hand rail by personnel, by a support arm 44 which engages post 26. Support arm 44 may be disengaged from post 26 and rotated clockwise about its pivot connection 46 to a stored position in which it rests on stop 48 attached to the side wall 42. Rail 24 is retained in its guide position as indicated at 24' by rotating the support arm 50 counter clockwise from its stored position, as shown in FIG. 1, to engage the post 28, which post is in its guide rail orientation at 28'.

In its stored position the support arm 50 engages stop 52 secured to side wall 42. When the rail 24 is lowered to its stored position, as indicated at 24'', it rests on limits 54 attached to sidewall 42. In this latter position the rail 24 and all of the posts are within the silhouette or outline of the conveyor 12 and thus cannot obscure the field of vision of an operator when the conveyor is fully lowered. Rail 24 is always oriented in a position substantially parallel to the conveyor since the posts 26, 28, 30 and 32 are of equal lengths and form a four bar or parallelogram linkage with the rail 24 and side wall 42.

Supporting and latching the rail 24 in its hand rail position is more completely illustrated in FIGS. 2 and 3. The post 26 is a square tube and is provided with a pin 56 which extends beyond the outside and inside surfaces of the post. Support arm 44, which is also formed from a square tube, has an end member 58 secured to its free end. The end member 58 has extended inner and outer side plates 60 and 62, each of which has a slot 64 and 66 respectively extending transversely to the longitudinal axis of support arm 44. The slots 64 and 66 slip over the protruding ends of pin 56.

A latch 70 is formed of two U-shaped members 72 and 74 secured together to encircle the post 26 and is slidable thereon. The outer member 72 has extended side plates 76 and 78 with slots 80 and 82 respectively extending longitudinally of post 26, which slots are engageable with the extended ends of pin 56. The inner member 74 has the same thickness as the side plates 60 and 62 on end member 58 and therefore space the sideplates 76 and 78 from the post 28 a distance sufficient to readily clear the latter plates. When the latch 70 is lowered from a raised position, as indicated at 70', until the slots 80 and 82 engage the pins 56, with the slots 64 and 66 of end member 58 already in engagement with the pin 56, the support arm 44 is effectively locked to the post 26 and cannot be disengaged until the latch 70 is raised. The latch 70 therefore prevents inadvertent disengagement of the support arm 44 from the post 26 and the rail 24 is maintained in a sturdy manner for its use as a hand rail.

Referring now to FIGS. 4 and 5, the support arm 50 is pivotally attached to the side wall by pin 86 and holds the rail 29 in its position for use as a guide rail, as shown at 24' in FIG. 1. An end member 88 is affixed to the support arm 50 and has a pair of extended plates 90 and 92. Slots 94 and 96 in plates 90 and 92 respectively engage a pin 98 attached to the post 28 and protruding beyond each side thereof. So positioned, the support arm 50 retains the rail 24 a short distance above the belt conveyor so that it may function as a guide rail.

While a preferred embodiment of the present invention has been illustrated and described herein, various modifications and changes may be made therein without departing from the spirit of the invention as defined by the scope of the appended claims.

What is claimed is:
1. A rail for an aircraft belt loader having a belt conveyor including an exterior side wall, wherein the improvement comprises:
   a plurality of posts each of which is pivotally connected at one end to the rail and at the other end to said side wall;
   a first pin affixed to one of said posts and protruding on each side thereof;
   a first support arm pivotally attached to said sidewall;
   a first end member affixed to said first support arm and including a pair of extended side plates having slots engageable with said first pin to support said rail in a hand rail position;

stops secured to said side wall and positioned to engage said rail when lowered to a stowed position in which said posts and said rail are entirely within the silhouette of said conveyor;

a second pin affixed to one of said posts and protruding on each side thereof; and a second support arm pivotally attached to said side wall and having a slotted end for engagement with said second pin to position said rail intermediate its said stowed position and its said hand rail position.

2. The invention according to claim 1, and further comprising:

a latch encircling said post and slidably mounted thereon above said first pin and moveable under the influence of gravity to straddle said extended side plates when said first end member is in engagement with said first pin.

* * * * *